(12) United States Patent
Cushman et al.

(10) Patent No.: US 12,512,569 B2
(45) Date of Patent: Dec. 30, 2025

(54) BATTERY SYSTEM (71) Applicant: IFBattery Inc., West Lafayette, IN (US)

(72) Inventors: John H. Cushman, West Lafayette, IN (US); Jared Cross, Zionsville, IN (US); Michael J. Dziekan, Park Ridge, IL (US)

(73) Assignee: IFBATTERY INC., West Lafayette, IN (US)

( * ) Notice: Subject to any disclaimer, the term of this patent is extended or adjusted under 35 U.S.C. 154(b) by 508 days.

(21) Appl. No.: 18/019,271

(22) PCT Filed: Aug. 5, 2021

(86) PCT No.: PCT/US2021/044623
§ 371 (c)(1),
(2) Date: Feb. 2, 2023

(87) PCT Pub. No.: WO2022/031900
PCT Pub. Date: Feb. 10, 2022

(65) Prior Publication Data
US 2023/0275332 A1    Aug. 31, 2023

Related U.S. Application Data

(60) Provisional application No. 63/061,945, filed on Aug. 6, 2020.

(51) Int. Cl.
*H01M 50/77*    (2021.01)
*H01M 10/613*    (2014.01)
*H01M 10/6569*    (2014.01)
*H01M 50/51*    (2021.01)

(52) U.S. Cl.
CPC ......... *H01M 50/77* (2021.01); *H01M 10/613* (2015.04); *H01M 10/6569* (2015.04); *H01M 50/51* (2021.01)

(58) Field of Classification Search
CPC . H01M 50/77; H01M 10/613; H01M 10/6569
See application file for complete search history.

(56) References Cited

U.S. PATENT DOCUMENTS

| 4,650,732 A | 3/1987 | Weber |
| 12,194,887 B1 * | 1/2025 | Boecker ............ B60H 1/00278 |
| 2010/0003545 A1 | 1/2010 | Horne et al. |

(Continued)

FOREIGN PATENT DOCUMENTS

| WO | WO2018169855 A1 | 9/2018 |
| WO | WO2020056003 A2 | 3/2020 |

(Continued)

OTHER PUBLICATIONS

International Search Report for international patent application No. PCT/US2021/044623, mailed on Dec. 17, 2021 (3 pages).

(Continued)

*Primary Examiner* — Olatunji A Godo
(74) *Attorney, Agent, or Firm* — MH2 Technology Law Group, LLP (57) ABSTRACT

Battery system and method for producing electricity and hydrogen. The system dissipates heat as electrolyte fluid flows through a battery to generate reaction products in an exothermic reaction.

19 Claims, 6 Drawing Sheets

(56) References Cited

U.S. PATENT DOCUMENTS

| | | |
|---|---|---|
| 2012/0308867 A1 | 12/2012 | Winter |
| 2012/0326672 A1* | 12/2012 | Dennis ................ H01M 12/085 320/134 |
| 2013/0302710 A1 | 11/2013 | Boersma et al. |
| 2019/0296383 A1 | 9/2019 | Cushman |
| 2021/0013531 A1 | 1/2021 | Cushman et al. |
| 2022/0042183 A1 | 2/2022 | Cushman et al. |
| 2022/0145479 A1* | 5/2022 | Seymour .................. C25B 1/04 |

FOREIGN PATENT DOCUMENTS

| | | |
|---|---|---|
| WO | WO2021168238 A1 | 8/2021 |
| WO | WO2022076672 A1 | 4/2022 |

OTHER PUBLICATIONS

Written Opinion for international patent application No. PCT/US2021/044623, mailed on Dec. 17, 2021 (5 pages).

\* cited by examiner

BATTERY SYSTEM

CROSS-REFERENCE TO RELATED APPLICATIONS

This application claims benefit of, and priority to, U.S. Provisional Application No. 63/061,945, filed on Aug. 6, 2020, the entire contents of which is specifically incorporated by reference herein.

FIELD OF THE DISCLOSURE

This disclosure relates to the field of batteries for the production of electricity and hydrogen and systems incorporating such batteries.

SUMMARY

The present disclosure includes a battery system and method for producing electricity and hydrogen. The system dissipates heat as electrolyte fluid flows through a battery to generate the reaction products in an exothermic reaction.

The system and method can be designed to generate substantial electric power and hydrogen gas at low pressure. The system and method could be designed to power a vehicle, such as a golf cart, either fully electrically or using a fuel cell, or a combination of the two. With use of batteries comprising a series of electrochemical cells as described herein, for example, the system and method can be conveniently scaled up as desired. The system and method can be applied to a variety of applications, such as powering vehicles and use in hydrogen assist.

More embodiments and features are included in the detailed description that follows, and will be readily apparent to those skilled in the art from the description or recognized by practicing the embodiments as described in the description, including in the figures and claims.

BRIEF DESCRIPTION OF THE DRAWINGS

The accompanying figures constitute a part of this disclosure. The figures serve to provide a further understanding of certain exemplary embodiments. The disclosure and claims are not limited to embodiments illustrated in the figures.

DETAILED DESCRIPTION

Various additional embodiments of the disclosure will now be explained in greater detail. Both the foregoing general description and the following detailed description are exemplary and explanatory only, and are not restrictive of this disclosure or of the claims. Any discussion of certain embodiments or features, including those depicted in the figures, serve to illustrate certain exemplary aspects of the disclosure. The disclosure and claims are not limited to the embodiments specifically discussed herein or illustrated in the figures.

An embodiment of the disclosure includes a battery system, comprising:
 (a) an electrolyte containment vessel for storage of a bulk volume of electrolyte fluid;
 (b) a battery containment vessel, comprising:
  an inlet for receiving electrolyte fluid from the electrolyte containment vessel,
  an outlet for returning electrolyte fluid to the electrolyte containment vessel, and
  a passage, positioned between the inlet and outlet, configured to enclose a battery comprising one or more electrochemical cells; and
 (c) means for dissipating heat from the battery system.

A method of the disclosure comprises:
 providing a battery system that comprises an electrolyte containment vessel storing a bulk volume of electrolyte fluid, and a battery containment vessel enclosing a battery comprising one or more electrochemical cells;
 circulating at least a portion of the electrolyte fluid between the electrolyte containment and battery containment vessels to produce electricity and hydrogen in an exothermic reaction; and
 dissipating heat from the battery system.

Figure 1:
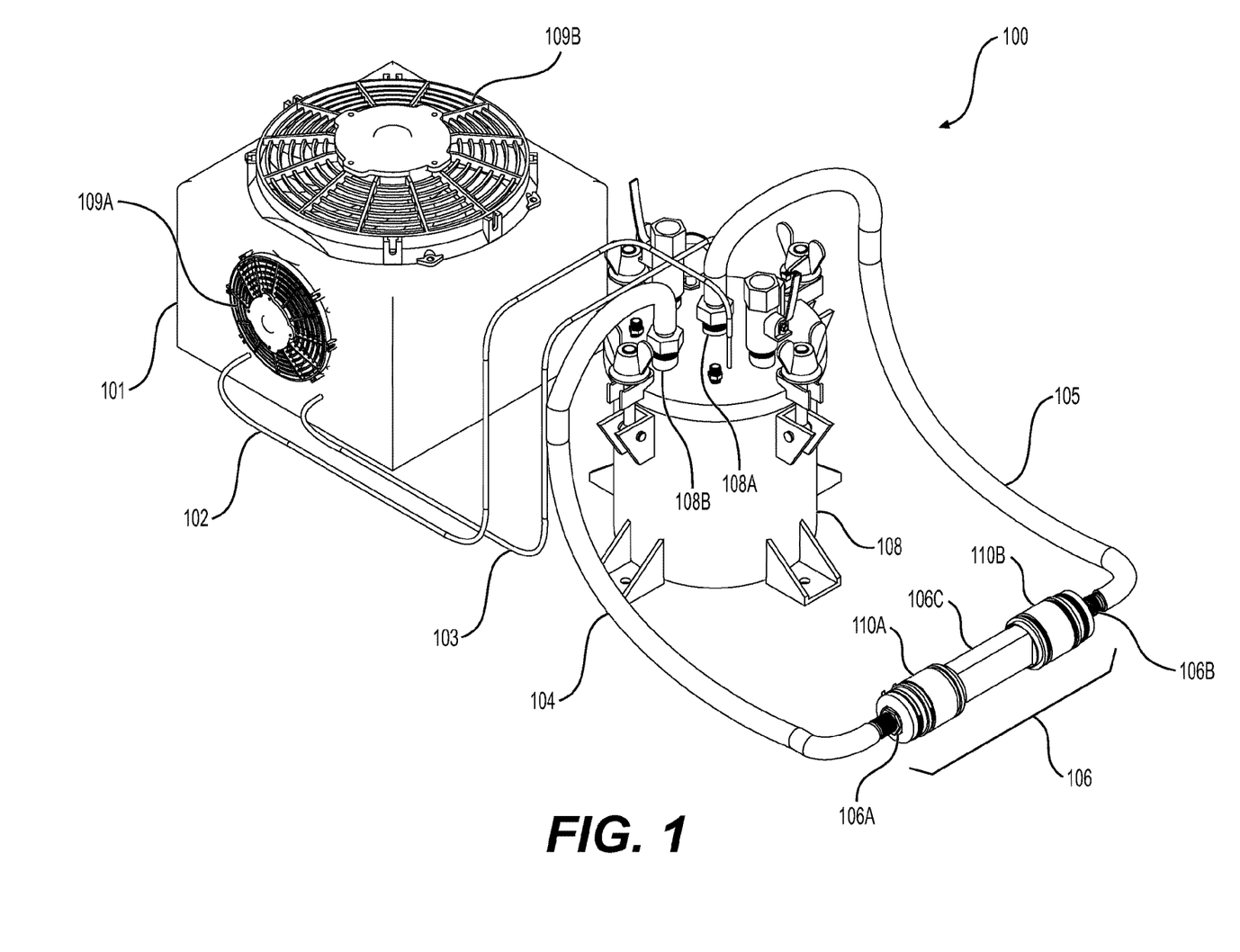
FIG. 1 illustrates an exemplary battery system of the disclosure.
Figure 2:
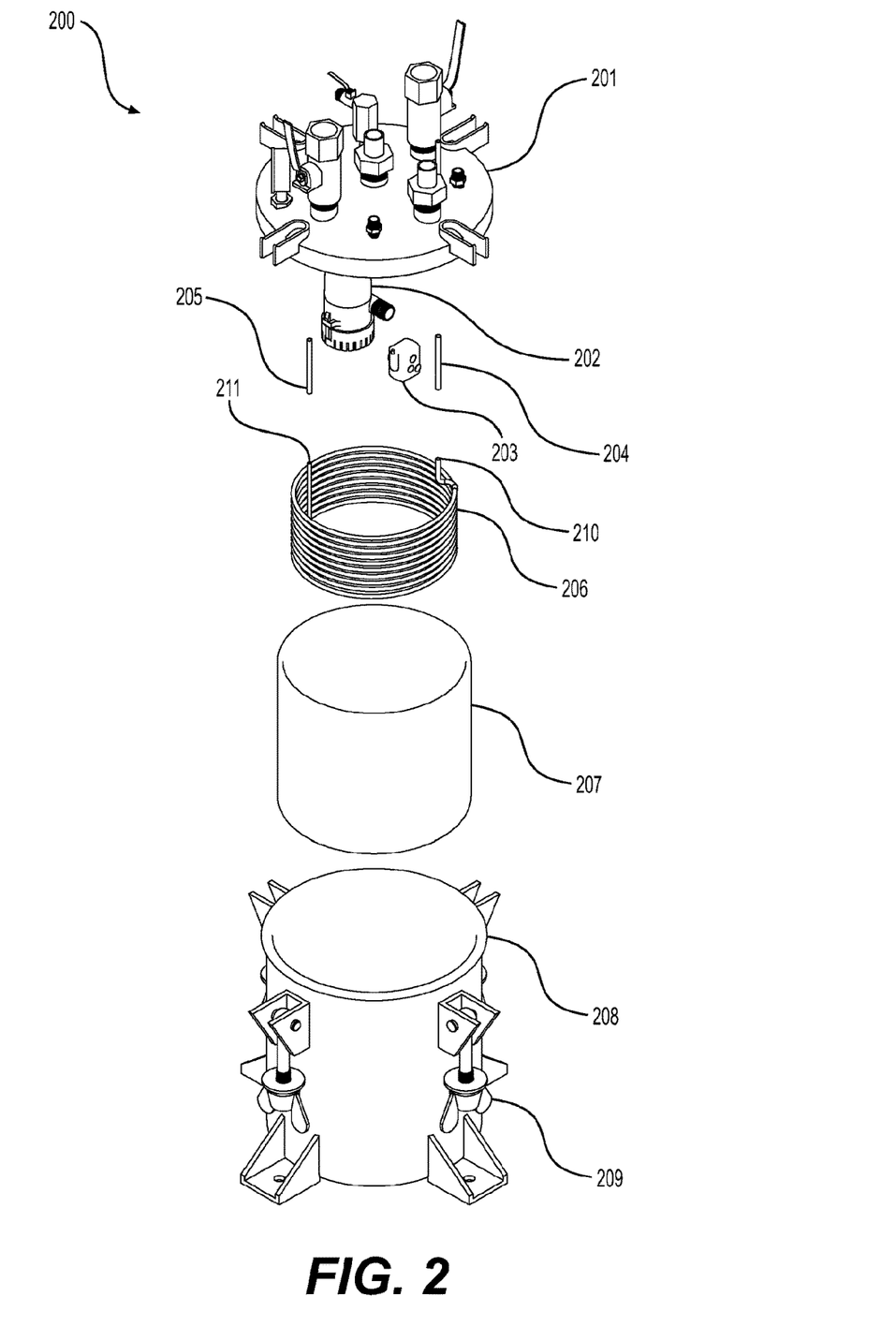
FIG. 2 illustrates an exploded view of an exemplary electrolyte containment vessel of the disclosure.

FIG. 1 illustrates one embodiment of a battery system 100 of the disclosure, showing electrolyte containment vessel 108 and a battery containment vessel 106 having inlet 106A, outlet 106B and passage 106C. The embodiment shown includes endcaps 110A and 110B forming the inlet and outlet of the battery containment vessel, respectively. The means for dissipating heat from the battery system is not visible in FIG. 1, but can be seen as cooling coil 206 disposed in the electrolyte containment vessel 200 as shown in FIG. 2. The electrolyte containment vessel can also include an inlet (108A in FIG. 1) and an outlet (108B in FIG. 1) to facilitate circulation of electrolyte fluid between the electrolyte containment vessel and the battery containment vessel.

Figure 4:
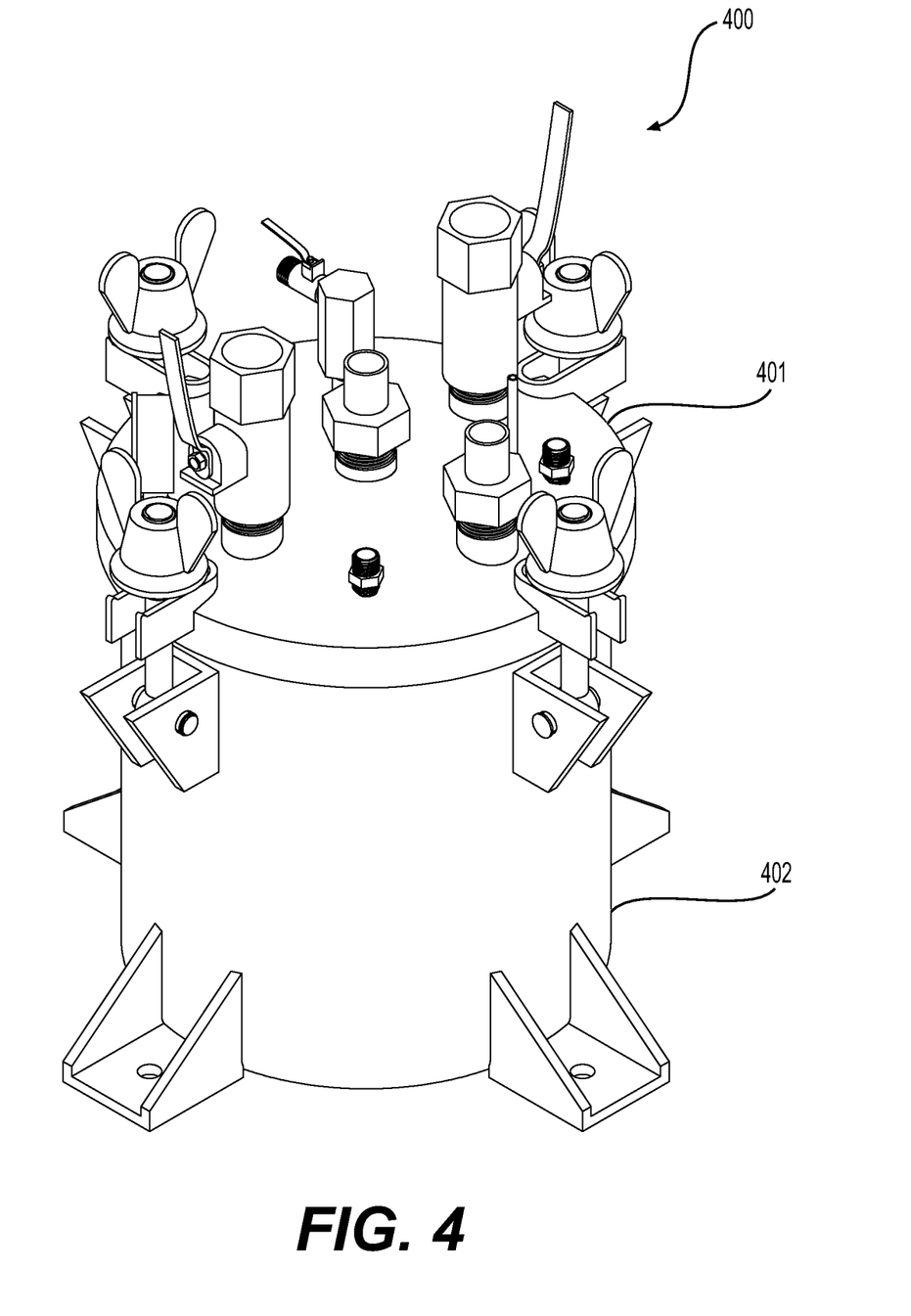
FIG. 4 illustrates an exemplary sealed electrolyte containment vessel having a main body and a lid.

The electrolyte containment vessel can have any appropriate structure and geometry. For instance, it may comprise a main body and a lid that together define an interior volume in which an electrolyte fluid can be contained. FIG. 4 illustrates such a vessel 400 having main body 402 and lid 401.

The battery system of the disclosure comprises means for dissipating heat from the system. In some embodiments, the means for dissipating heat is disposed in the electrolyte containment vessel. Such a means for dissipating heat can comprise a conduit in which a coolant can flow in thermal communication with an electrolyte fluid in the vessel. For example, the means for dissipating heat may be a cooling coil positioned such that it can contact an electrolyte fluid present in the electrolyte containment vessel. FIG. 2 illustrates such an exemplary cooling coil 206 disposed within the vessel. The cooling coil can have an inlet to receive new or replenished coolant and an outlet to expel an expended coolant.

The method of the disclosure includes use of a battery system that comprises an electrolyte containment vessel storing a bulk volume of electrolyte fluid, and a battery containment vessel enclosing a battery comprising one or more electrochemical cells.

The method includes dissipating heat from the battery system as it operates. The method may include, but is not limited to, the use of certain means for dissipating heat described herein for the system of the disclosure. The method for dissipating heat can include, for example, contacting any interior or exterior portion of the battery system with a coolant or with a conduit in which a coolant is flowing. The method can therefore comprise dissipating heat from electrolyte fluid in the electrolyte containment vessel. The method can dissipate heat from the electrolyte fluid by contacting it with a conduit, such as a cooling coil, in which a coolant flows in thermal communication with the electrolyte fluid.

In other embodiments, the means for dissipating heat from the battery system is in contact with the battery containment vessel. Such a means for dissipating heat can be, for example, a tube-in-tube heat exchanger or shell-and-tube heat exchanger that incorporates the battery containment vessel in its design. The method of the disclosure can also comprise this means for dissipating heat from the battery containment vessel. For example, battery containment vessel 106 in FIG. 1 could be incorporated into a heat exchanger design to withdraw heat from the vessel. A shell-and-tube heat exchanger could be used, for example, if the battery system comprises multiple battery containment vessels arranged in series or in parallel.

In further embodiments, the means for dissipating heat from the battery system (c) is a heat exchanger positioned external to the electrolyte containment vessel, in which a coolant flows in thermal communication with the electrolyte fluid. One example of such a heat exchanger is a plate heat exchanger. A heat exchanger "positioned external to" the electrolyte containment vessel indicates that the heat exchanger is not disposed within the electrolyte containment vessel.

Figure 5:
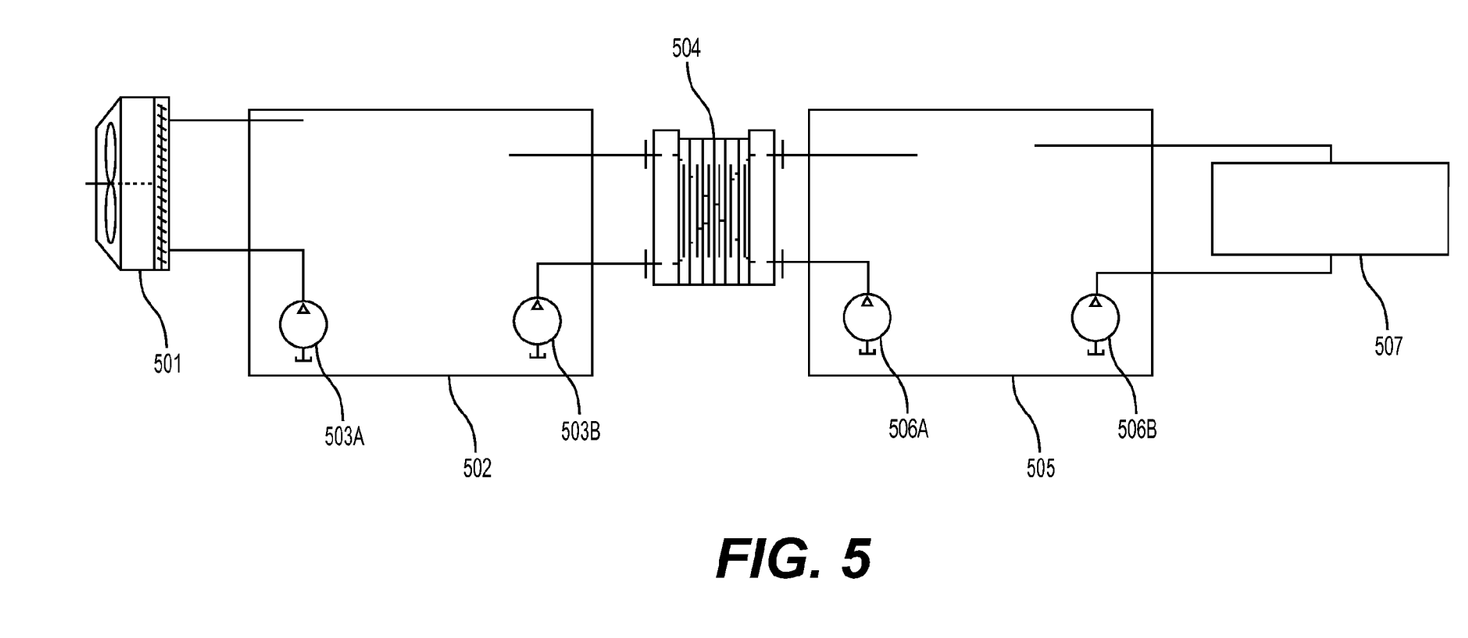
FIG. 5 illustrates another exemplary battery system of the disclosure.

Electrolyte fluid may flow from the electrolyte containment vessel to the external heat exchanger, cool in the heat exchanger, such as through contact with plates in a plate heat exchanger, then return to the electrolyte containment vessel. The heat exchanger may use circulating water, for example, as a coolant. One example of such an embodiment is shown in FIG. 5, where electrolyte fluid from electrolyte fluid containment vessel 505 flows through plate heat exchanger 504 via a pump 506A. Appropriate tubing, hoses or other conduits may provide for passage of electrolyte fluid and water through the heat exchanger.

The battery system of the disclosure may further comprise a coolant system (d) configured to circulate coolant to the means for dissipating heat (c), wherein the coolant system is configured to accept expended coolant from the means for dissipating heat and return a lower temperature replenished coolant to the means for dissipating heat.

In some embodiments, the coolant system can be, for example, a radiator, pump, compressor system or other heat exchanger. For instance, the coolant system can be a fin-and-tube heat exchange radiator configured to flow expended coolant through the tube and dissipate heat through fins to produce a lower temperature replenished coolant. FIG. 1 illustrates such a coolant system in the form of a radiator 101 circulating coolant through coolant lines 102 and 103. FIG. 5 also illustrates such a coolant system in the form of radiator 501, which cools a water bath 502 that serves as a source of cooling water for plate heat exchanger 504.

The method of the disclosure can also comprise providing a coolant system circulating coolant in the battery system, wherein the coolant system accepts expended coolant in the battery system and returns a lower temperature replenished coolant. Exemplary methods can include circulating coolant to a cooling coil disposed in the electrolyte containment vessel, circulating coolant to a tube-in-tube heat exchanger or shell-and-tube heat exchanger that incorporates the battery containment vessel, circulating coolant through any conduit that contacts any portion of the system or contacting any portion of the system directly with coolant.

The coolant may be selected from any appropriate materials, components or substances. The coolant can be in the form of a liquid or a gas. Exemplary coolants include water and any appropriate refrigerants, such as R134a.

In yet further embodiments, the means for dissipating heat from the battery system is positioned in-line between the electrolyte containment vessel and battery containment vessel and is configured to dissipate heat from an electrolyte fluid circulating between the vessels. In this embodiment, electrolyte fluid can be cooled directly in-line without use of a separate coolant.

The in-line means for dissipating heat can be, for example, a radiator, tube-in-tube heat exchanger or shell-and-tube heat exchanger configured to accept an electrolyte fluid circulating between the electrolyte containment vessel and the battery containment vessel and to return a lower temperature electrolyte fluid to circulation. For instance, the means for dissipating heat can be a fin-and-tube heat exchanger configured to flow electrolyte fluid through the tube and dissipate heat through fins to produce a lower temperature electrolyte fluid. The in-line means for dissipating heat can be positioned, for example, at a location where heated electrolyte fluid is flowing back to the electrolyte containment vessel. An in-line means for dissipating heat would advantageously be resistant to corrosion by the electrolyte fluid. For example, it could be made of or comprise stainless steel. The method of the disclosure can also comprise dissipating heat from the electrolyte fluid at a position between the electrolyte containment vessel and battery containment vessel using these techniques.

The battery system and method of the disclosure can include multiple means or techniques for dissipating heat from the battery system. For example, the system and method can include a means for dissipating heat in the electrolyte containment vessel, a means for dissipating heat from the battery containment vessel, a means for dissipating heat from electrolyte fluid circulating between the electrolyte containment vessel and battery containment vessel, and any combinations of two or more of these.

Figure 3A:
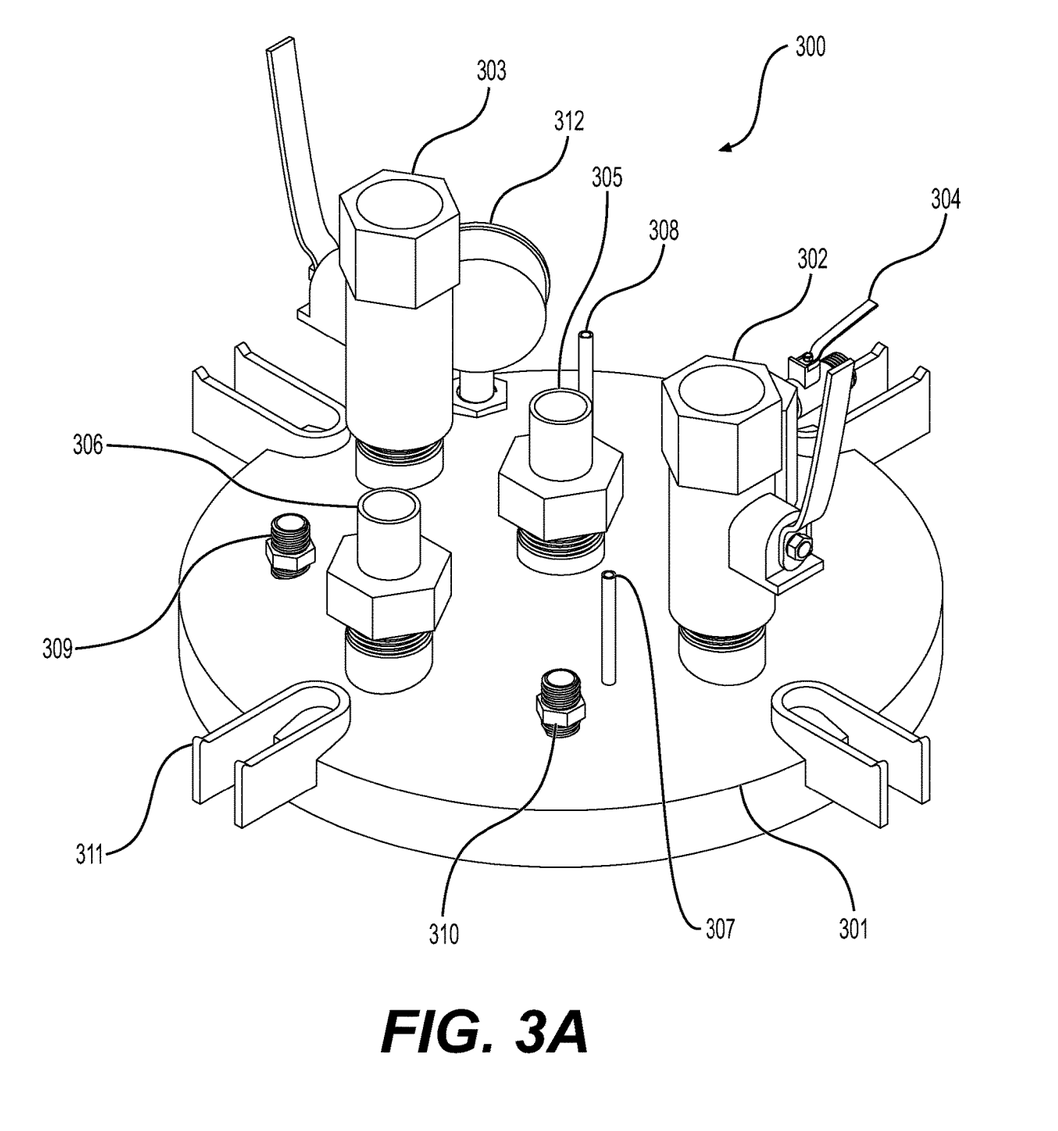
FIG. 3A illustrates an exemplary lid for an electrolyte containment vessel of the disclosure.
Figure 3B:
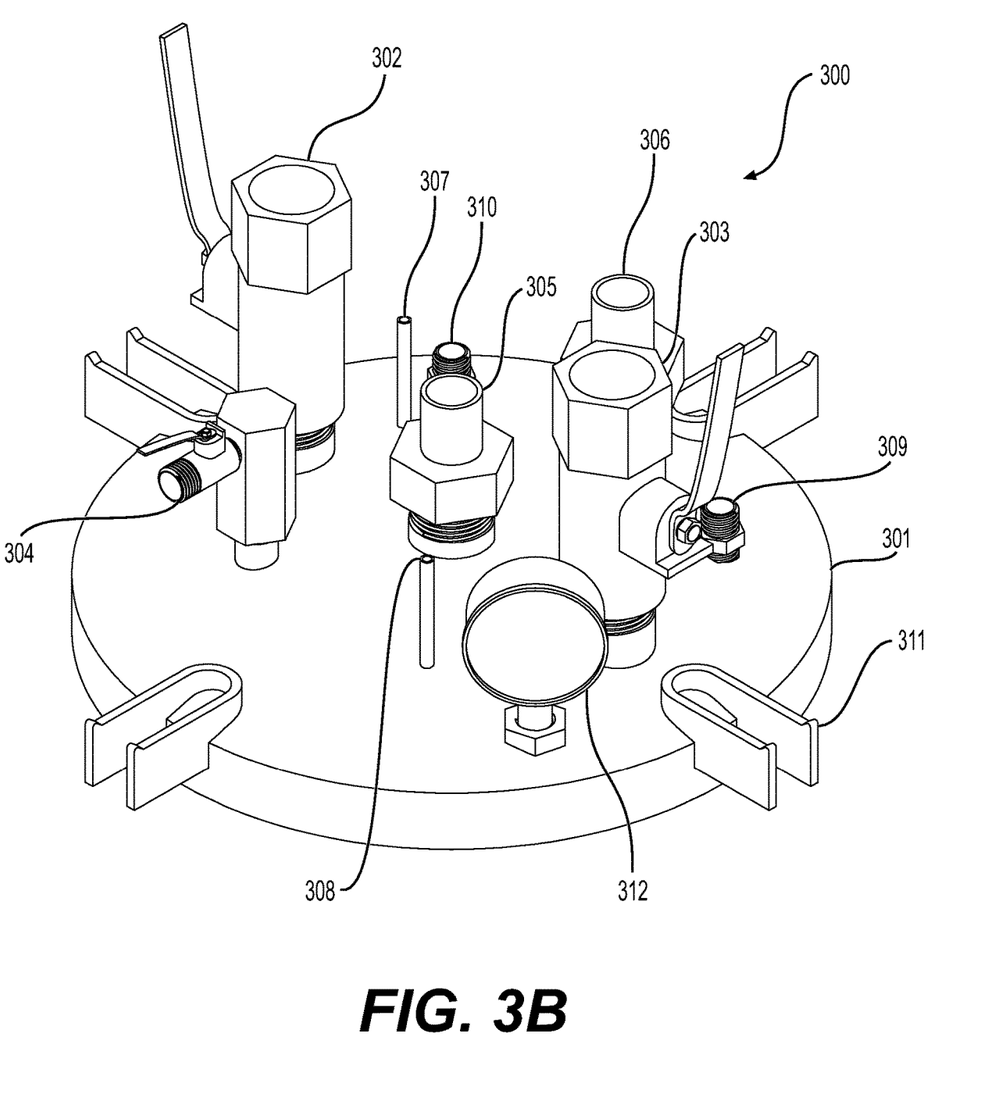
FIG. 3B illustrates an alternative view of an exemplary lid for an electrolyte containment vessel of the disclosure.

The battery system and method of the disclosure can produce electricity and hydrogen gas. The battery system may therefore include a gas exhaust valve for withdrawing hydrogen gas from the system, such as during operation. The gas exhaust valve may be positioned at any appropriate location of the system. In some embodiments, the gas exhaust valve is placed on the lid of the electrolyte containment vessel in fluid communication with the interior volume of the vessel. Such a valve may be used, for example, to withdraw gas in the head space above the electrolyte fluid. FIGS. 3A and 3B illustrate such a gas exhaust valve 304 on lid 301.

The method of the disclosure can also include generating hydrogen gas and withdrawing the gas from the battery system through a gas exhaust valve, such as an exhaust valve that is in fluid communication with a head space above electrolyte fluid in the electrolyte containment vessel. Alternatively, the gas valve can be positioned elsewhere in the system such as on or around the battery containment vessel where hydrogen is produced.

The battery system and method may extract electricity from the system using any appropriate technique. For example, the opposite ends of the battery may each be connected to a wire, and the wires maybe routed to connect to a load. In some embodiments, the wires are routed through conduits connecting the electrolyte containment vessel and battery containment vessel that also carry circulating electrolyte. The wires may, for example, extend from the battery containment vessel to the electrolyte containment vessel and then exit the system through a port or ports on the lid of the electrolyte containment vessel.

The battery system may include any appropriate battery than comprises one or more electrochemical cells. The battery system may be assembled, sold, or stored without including a battery. Batteries can be made separately from the system and may be used and replaced in the battery system as needed. The battery containment vessel may therefore be designed to allow for convenient replacement of separable batteries throughout the usable life of the system.

During operation, the battery system of the disclosure comprises a battery disposed in the battery containment vessel. In some embodiments, the battery comprises at least one electrochemical cell comprising an anode and a cathode current collector configured to contact a shared electrolyte fluid. Such electrochemical cells are disclosed in international applications WO 2018/169855 A1 and WO 2020/056003 A2 to IFBattery Inc., the entire contents of both of which are specifically incorporated by reference herein. This contrasts with conventional batteries that require use of separate electrolyte fluids for each half cell. Many embodiments of the disclosure therefore do not comprise a partition between an electrolyte fluid for the anode and a separate electrolyte fluid for a cathode or cathode current collector.

The battery may comprise a series of two or more of such electrochemical cells, each cell comprising an anode and a cathode current collector configured to contact a shared electrolyte fluid. The series of electrochemical cells may be arranged in a linear or serpentine configuration and can be positioned such that the electrolyte fluid flowing from the inlet to the outlet of the battery containment vessel flows from one end of the series to the other end of the series.

Embodiments of the system and method disclosed herein therefore include a bulk electrolyte fluid disposed in the electrolyte containment vessel, wherein the bulk fluid can be or is circulated through the battery containment vessel such that both the anode and cathode current collector within each cell in the battery contact the same shared electrolyte fluid. In embodiments wherein the battery comprises multiple electrochemical cells in series, the bulk electrolyte can flow from one end of the series to the other end of the series such that all cells in the series contact the same shared electrolyte fluid.

In embodiments when the battery comprises a series of electrochemical cells, the series can be designed such that the cathode current collector of at least one cell in the series is in physical contact with the anode of an adjacent cell. Such a series design can be as disclosed in WO 2020/056003.

Exemplary materials of construction for electrochemical cells in the battery of the disclosure can include aluminum or an aluminum alloy for the anodes and phosphor bronze for the cathode current collectors.

The electrolyte fluid for the battery system or method of the disclosure can include any appropriate components. Exemplary electrolyte compositions for use in the battery system and methods are disclosed in WO 2018/169855 A1 and WO 2020/056003 A2. In some embodiments, the electrolyte fluid comprises 1) water and 2) an oxidant that is a salt or acid; or, an oxidant and a salt. In some embodiments, the electrolyte fluid comprises 1) water and 2) an oxidant that is a salt or acid. In other embodiments, the electrolyte fluid comprises 1) water and 2) an oxidant and a salt. An exemplary electrolyte fluid comprises 1) water, 2) sodium peroxydisulfate(aq), peroxydisulfuric acid(aq), peroxydisulfate anion ($S_2O_8^{2-}$), or any combinations of two or more of these, and optionally 3) a base and optionally 4) a metal sulfate. One exemplary base is sodium hydroxide and one exemplary metal sulfate is sodium sulfate.

Heat dissipated from the battery system could simply be expended into the atmosphere or directed more usefully to a separate heating system. Such a heating system could supply heat, for example, to a home or vehicle. Alternatively, heat dissipated from the system could be utilized by an extreme cold climate battery to maintain steady, efficient operation.

Hydrogen gas exhaust from the battery system may also be collected and incorporated into useful applications. Hydrogen is known to be especially volatile at even moderate pressures and temperatures, but can be safely removed and stored with a battery system of the disclosure. The uses for hydrogen generated by the battery system could include, but are not limited to, storage in a hydrogen cell to be used for electricity and use for direct injection of hydrogen into a vehicle fuel pumping system. Hydrogen exhaust could alternatively be cleanly and safely released into the atmosphere, or stored in a reservoir either integrated into or detached from the system, to be released at a later point in time.

The following discussion details additional features of certain non-limiting embodiments of the disclosure, as shown in the figures.

FIG. 1 illustrates an exemplary battery system 100 of the disclosure. Coolant system 101 is a radiator with a fin and tube heat exchanger using fans to draw heat from the coolant running through it. The exiting cold coolant is then sent to the coil within the electrolyte containment vessel 108 to draw heat from the electrolyte fluid in the vessel. The heated coolant is then sent back to the radiator where it is cooled again. The radiator has two fans 109A and 1096 in order to properly ventilate heat through the system. There is also a pump contained within the radiator to flow coolant.

The battery system includes coolant hose 102 that provides coolant from the radiator outlet to the electrolyte containment vessel coolant inlet. Coolant hose 103 provides for return of expended coolant from the electrolyte containment vessel coolant outlet to the radiator inlet.

Electrolyte fluid circulates between the electrolyte containment vessel and battery containment vessel. To accommodate such electrolyte circulation, the battery system may comprise a tube or other conduit connecting the inlet of the electrolyte containment vessel with the outlet of the battery containment vessel, and a tube or other conduit connecting the outlet of the electrolyte containment vessel with the inlet of the battery containment vessel. In FIG. 1, electrolyte fluid flows from the electrolyte containment vessel electrolyte outlet to the battery containment vessel electrolyte inlet, and vice versa, through fluid hoses 104 and 105, respectively. In battery containment vessel 106, electricity, hydrogen gas and heat are produced in an exothermic reaction.

FIG. 2 illustrates an exploded view of an exemplary electrolyte containment vessel 200 of the disclosure. The vessel comprises a lid, with certain added features, 201. The vessel can include an electrolyte circulation pump 202 to circulate electrolyte fluid between the electrolyte containment vessel and battery containment vessel. The electrolyte containment vessel also includes fluid removal pump 203. Elements 204 and 205 are inlet and outlet hoses, respectively, for coolant circulating between the electrolyte containment vessel and cooling system. Means for dissipating heat, shown as a cooling coil 206, is disposed in the vessel. The cooling coil includes inlet 210 and outlet 211 for coolant. A non-corrodible structure 207, such as one made of stainless steel, is disposed within container 208. Four bolts 209 are included to seal the lid to the remainder of the structure.

FIGS. 3A and 3B illustrate different views of an exemplary lid, with certain added features, 300 for an electrolyte containment vessel of the disclosure. Lid 301 of the electrolyte containment vessel seals the vessel. Features such as multiple points of fluid inlets and outlets, as well as spots for sensor wires to be routed, are added on the lid 301. Fluid inlet dump valve main 302 provides for input of electrolyte fluid to the system after it has been set up and sealed for operation. Fluid inlet dump valve secondary 303 is a secondary valve that can be used to provide for the input of electrolyte fluid to the system after it has been setup and sealed for operation.

Gas exhaust valve 304 is used to control the rate of hydrogen gas exhaust from the system. As an alternative to what is shown in FIGS. 3A and 3B, the location of hydrogen collection could be more directly connected to the battery or battery containment vessel, which would avoid hydrogen being transported from the battery to electrolyte containment vessel.

Fluid inlet nozzle 305 receives electrolyte fluid from the battery containment vessel via a connected hose. The fluid could be cooled then returned through a hose via a pump to the battery containment vessel through fluid outlet nozzle 306.

Coolant inlet nozzle 307 receives coolant, such as water, from a radiator or other coolant system. The coolant may be sent to a means for dissipating heat from the system, such as a cooling coil, to draw heat from electrolyte fluid in the electrolyte containment vessel. Expended coolant is pulled through coolant outlet nozzle 308 after drawing heat from the system. The coolant is then sent to a radiator or other cooling system.

Sensor wire inlet/outlet 309 is provided as a small opening on the lid where one or more wires are run through to be used as sensors, such as thermocouples. Sensor wires could be selected and used to measure and control system input and output power through measurement of, for example, pressure, temperature, electrolyte flow rate or molecular changes over time. Element 310 is an excess fluid pump outlet. To maintain system steady state operation over time, electrolyte fluid (or one or more components thereof) can be replaced at a steady rate. The electrolyte containment vessel can therefore comprise an inlet such as 302 for providing new electrolyte fluid (or one or more components thereof), an outlet such as 310 for expelling at least a portion of expended electrolyte fluid, and a fluid removal pump such as 203 in FIG. 2 to expel at least a portion of bulk electrolyte fluid through outlet 310. This arrangement can accommodate a steady rate of replenishing the electrolyte in the battery system.

Four bolt hooks 311 are provided to keep the lid sealed tightly to the remainder of the electrolyte containment vessel structure using bolts. Lastly, pressure gauge 312 is included for monitoring pressure inside the electrolyte containment vessel.

The arrangement of features (such as ports) on the lid in FIGS. 3A and 3B is arbitrary and can be modified in any way that is geometrically possible. For example, the port for the sensor wires may be positioned elsewhere in the system, such as directly on the battery containment vessel or in or around various other parts for each individual sensor wire to be placed.

The fluid inlet dump valves are included for practical purposes in this design and may be removed entirely and replaced with a single inlet port for electrolyte fluid to be pumped in from an external source. The electrolyte fluid could also be placed into the system before being sealed, then the inlet dump valves as well as the outlet pump orifice could be removed. With the system sealed it could operate without addition or removal of electrolyte fluid. This could be useful, for example, in the case of single use or disposable applications of the battery system.

FIG. 4 illustrates an exemplary electrolyte containment vessel 400 having main body 402 and a lid 401. The lid includes certain features such as components for the electrolyte pump system, coolant system and exhaust system. Included in the vessel are, among other things, a pump to circulate electrolyte fluid to the battery containment vessel, a pump to remove electrolyte fluid from the vessel, and a cooling coil. This and other figures illustrate the electrolyte containment vessel as generally cylindrical in shape. The vessel may also be shaped in any other appropriate geometry, such as in the form of box having 3, 4, 5, or 6 or more distinct walls, such as a square or rectangular box. The vessel may be in the form of a canister of cylindrical or rectangular shape, for example, with a removable lid, where the lid can form a seal with the remainder of the vessel structure.

FIG. 5 illustrates another exemplary battery system of the disclosure. Electrolyte fluid from electrolyte containment vessel 505 flows through battery containment vessel 507 via pump 506B. Bulk electrolyte fluid from the electrolyte containment vessel is cooled by flowing it through external plate heat exchanger 504 via pump 506A. Plate heat exchanger 504 uses cooling water sourced from water bath 502. The plate heat exchanger can allow for high efficiency heat transfer between the water bath and electrolyte fluid without the fluids mixing. Cooling water flows through plate heat exchanger 504 via pump 503B. The cooling water is itself cooled by passing it through radiator 501 via pump 503A. All pumps may be made of any appropriate material, such as ABS plastic. The heat exchanger is advantageously made of a material that is resistant to corrosion by the electrolyte fluid, such as copper-brazed stainless steel that can be plated externally in nickel.

Various additional embodiments of the disclosure include those provided in the following clauses.

Clause 1. A battery system, comprising:
(a) an electrolyte containment vessel for storage of a bulk volume of electrolyte fluid;
(b) a battery containment vessel, comprising:
an inlet for receiving electrolyte fluid from the electrolyte containment vessel,
an outlet for returning electrolyte fluid to the electrolyte containment vessel, and
a passage, positioned between the inlet and outlet, configured to enclose a battery comprising one or more electrochemical cells; and
(c) means for dissipating heat from the battery system.

Clause 2. The battery system of clause 1, wherein the electrolyte containment vessel comprises a main body and a lid that together define an interior volume in which an electrolyte fluid can be contained.

Clause 3. The battery system of any one of clauses 1-2, wherein the electrolyte containment vessel comprises an inlet and an outlet for electrolyte fluid to circulate between the electrolyte containment vessel and the battery containment vessel.

Clause 4. The battery system of any one of clauses 1-3, which further comprises a battery disposed in the battery containment vessel.

Clause 5. The battery system of clause 4, wherein the battery comprises at least one electrochemical cell comprising an anode and a cathode current collector configured to contact a shared electrolyte fluid.

Clause 6. The battery system of clause 5, which comprises a series of electrochemical cells, each cell comprising an anode and a cathode current collector configured to contact a shared electrolyte fluid.

Clause 7. The battery system of clause 6, wherein the cells in the series are positioned such that an electrolyte fluid flowing from the inlet to the outlet of the battery containment vessel will flow from one end of the series to the other end of the series.

Clause 8. The battery system of clause 7, wherein the cathode current collector of at least one cell in the series is in physical contact with the anode of an adjacent cell.

Clause 9. The battery system of any one of clauses 4-8, wherein the battery comprises one or more cells each having an anode comprising aluminum or an aluminum alloy and a cathode current collector comprising phosphor bronze.

Clause 10. The battery system of any one of clauses 1-9, wherein the means for dissipating heat from the battery system is disposed in the electrolyte containment vessel.

Clause 11. The battery system of clause 10, wherein the means for dissipating heat comprises a conduit in which a coolant can flow in thermal communication with an electrolyte fluid in the electrolyte containment vessel.

Clause 12. The battery system of clause 11, wherein the means for dissipating heat is a cooling coil positioned such that it can contact an electrolyte fluid in the electrolyte containment vessel.

Clause 13. The battery system of any one of clauses 1-9, wherein the means for dissipating heat from the battery system is in contact with the battery containment vessel.

Clause 14. The battery system of clause 13, wherein the means for dissipating heat is a tube-in-tube heat exchanger or shell-and-tube heat exchanger that incorporates the battery containment vessel in its design.

Clause 15. The battery system of any one of clauses 1-14 and 45-47, which further comprises a coolant system (d) configured to circulate coolant to the means for dissipating heat (c), wherein the coolant system is configured to accept expended coolant from the means for dissipating heat and return a lower temperature replenished coolant to the means for dissipating heat.

Clause 16. The battery system of clause 15, wherein the coolant system is a radiator, pump, compressor system or other heat exchanger.

Clause 17. The battery system of clause 16, wherein the coolant system is a fin-and-tube heat exchange radiator configured to flow expended coolant through the tube and dissipate heat through fins to produce a lower temperature replenished coolant.

Clause 18. The battery system of any one of clauses 1-9, wherein the means for dissipating heat from the battery system is positioned between the electrolyte containment vessel and battery containment vessel and is configured to dissipate heat from an electrolyte fluid circulating between the vessels.

Clause 19. The battery system of clause 18, wherein the means for dissipating heat is a radiator, tube-in-tube heat exchanger or shell-and-tube heat exchanger configured to accept an electrolyte fluid circulating between the electrolyte containment vessel and the battery containment vessel and to return a lower temperature electrolyte fluid to circulation.

Clause 20. The battery system of clause 19, wherein the means for dissipating heat is a fin-and-tube heat exchanger configured to flow electrolyte fluid through the tube and dissipate heat through fins to produce a lower temperature electrolyte fluid.

Clause 21. The battery system of any one of clauses 1-20 and 45-47, which further comprises a hydrogen gas exhaust valve.

Clause 22. The battery system of clause 21, wherein the hydrogen gas exhaust valve is in fluid communication with the interior volume of the electrolyte containment vessel.

Clause 23. A method, comprising:
providing a battery system that comprises an electrolyte containment vessel storing a bulk volume of electrolyte fluid, and a battery containment vessel enclosing a battery comprising one or more electrochemical cells;
circulating at least a portion of the electrolyte fluid between the electrolyte containment and battery containment vessels to produce electricity and hydrogen in an exothermic reaction; and
dissipating heat from the battery system.

Clause 24. The method of clause 23, wherein the battery system is a battery system of any one of clauses 1-22 and 45-47.

Clause 25. The method of any one of clauses 23-24, which comprises dissipating heat from the battery system by contacting any portion of the battery system with a coolant or with a conduit in which a coolant is flowing.

Clause 26. The method of any one of clauses 23-25, which comprises dissipating heat from electrolyte fluid in the electrolyte containment vessel.

Clause 27. The method of any one of clauses 23-26, which comprises dissipating heat from the electrolyte fluid by contacting it with a conduit in which a coolant flows in thermal communication with the electrolyte fluid.

Clause 28. The method of clause 27, which comprises dissipating heat from electrolyte fluid in the electrolyte containment vessel by contacting it with a cooling coil.

Clause 29. The method of clause 23, which comprises dissipating heat from the battery containment vessel.

Clause 30. The method of clause 29, which comprises dissipating heat from the battery containment vessel by incorporating the vessel into a tube-in-tube heat exchanger or shell-and-tube heat exchanger.

Clause 31. The method of any one of clauses 23-30 and 48-49, which comprises providing a coolant system circulating coolant in the battery system, wherein the coolant system accepts expended coolant in the battery system and returns a lower temperature replenished coolant in the battery system.

Clause 32. The method of clause 31, wherein the coolant system is a radiator, pump, compressor system or other heat exchanger.

Clause 33. The method of clause 32, wherein the coolant system is a fin-and-tube heat exchange radiator configured to flow expended coolant through the tube and dissipate heat through fins to produce a lower temperature replenished coolant.

Clause 34. The method of any one of clauses 23-33, which comprises circulating coolant to a cooling coil disposed in the electrolyte containment vessel.

Clause 35. The method of any one of clauses 23-33, which comprises circulating coolant to a tube-in-tube heat exchanger or shell-and-tube heat exchanger that incorporates the battery containment vessel.

Clause 36. The method of any one of clauses 25-28, 31-35 and 48-49, wherein the coolant comprises water or a refrigerant.

Clause 37. The method of clause 23, which comprises dissipating heat from the electrolyte fluid at a position between the electrolyte containment vessel and battery containment vessel.

Clause 38. The method of clause 37, which comprises flowing the electrolyte fluid through a radiator, tube-in-tube heat exchanger or shell-and-tube heat exchanger.

Clause 39. The method of clause 38, wherein the radiator is a fin-and-tube heat exchanger configured to flow electrolyte fluid through the tube and dissipate heat through fins to produce a lower temperature electrolyte fluid.

Clause 40. The method of any one of clauses 23-39 and 48-49, which comprises withdrawing hydrogen gas from the battery system through a hydrogen gas exhaust valve.

Clause 41. The method of clause 40, wherein the hydrogen gas exhaust valve is in fluid communication with a headspace above electrolyte fluid in the electrolyte containment vessel.

Clause 42. The method of any one of clauses 23-41 and 48-49, wherein the electrolyte fluid comprises:
water, and
an oxidant that is a salt or acid; or, an oxidant and a salt.

Clause 43. The method of clause 42, wherein the electrolyte fluid comprises:
water,
sodium peroxydisulfate(aq), peroxydisulfuric acid(aq), peroxydisulfate anion ($S_2O_8^{2-}$), or any combinations of two or more of these,
optionally, a base, and
optionally, a metal sulfate.

Clause 44. The method of clause 43, wherein the base is sodium hydroxide and the metal sulfate is sodium sulfate.

Clause 45. The battery system of any one of clauses 1-9, wherein the means for dissipating heat from the battery system is a heat exchanger positioned external to the electrolyte containment vessel.

Clause 46. The battery system of clause 46, wherein the heat exchanger is a plate heat exchanger.

Clause 47. The battery system of any one of clauses 45-46, wherein the heat exchanger is configured to accept a flow of electrolyte fluid from the electrolyte containment vessel, cool the electrolyte fluid through thermal communication with a coolant, and return a flow of cooled electrolyte fluid to the electrolyte containment vessel.

Clause 48. The method of any one of clauses 23-24, which comprises providing a flow of electrolyte fluid from the electrolyte containment vessel to an external heat exchanger, cooling the electrolyte fluid through thermal communication with a coolant in the heat exchanger, and returning a flow of cooled electrolyte fluid to the electrolyte containment vessel.

Clause 49. The method of clause 48, wherein the heat exchanger is a plate heat exchanger.

Example (Prophetic)

A series of two or more electrochemical cells is made using an anode size of 1.75 in (4.45 cm)×2.5 in (6.35 cm)×0.125 in (0.318 cm), with 1.75 in (4.45 cm) being the width, 2.5 in (6.35 cm) being the length along the path of flow of electrolyte fluid and 0.125 in (0.318 cm) being the thickness. The anode material used is aluminum alloy 6061-T6511. A phosphor bronze cathode current collector is arranged as separate sheets placed on either side of an anode. The series includes cells where the cathode current collector of a cell is in physical contact with the anode of an adjacent cell. The electrolyte fluid is 5 M NaOH and 1 M $Na_2S_2O_8$.

A battery system is provided as shown in FIG. 1. Electrolyte fluid in the electrolyte containment vessel is circulated through the series of cells in the battery containment vessel under an electrical load. Heat is dissipated using a cooling coil disposed in the electrolyte containment vessel. The radiator coolant system circulates coolant to the cooling coil. Operation of the battery system can produce measurable or calculated max power in Watts, open circuit voltage, resistance at max power in ohms, and other performance data. The temperature of electrolyte fluid in the electrolyte containment vessel can be measured in degrees Centigrade.

We claim:

1. A battery system, comprising:
(a) an electrolyte containment vessel for storage of a bulk volume of electrolyte fluid;
(b) a battery containment vessel, comprising:
an inlet for receiving electrolyte fluid from the electrolyte containment vessel,
an outlet for returning electrolyte fluid to the electrolyte containment vessel, and
a passage, positioned between the inlet and outlet, that encloses a battery comprising one or more electrochemical cells, wherein at least one electrochemical cell comprises an anode and a cathode current collector configured to contact a shared electrolyte fluid; and
(c) means for dissipating heat from the battery system, wherein the battery system does not comprise a partition between an electrolyte fluid for an anode and a separate electrolyte fluid for a cathode or cathode current collector.

2. The battery system of claim 1, wherein the electrolyte containment vessel comprises an inlet and an outlet for electrolyte fluid to circulate between the electrolyte containment vessel and the battery containment vessel.

3. The battery system of claim 1, wherein the battery comprises a series of electrochemical cells, each cell comprising an anode and a cathode current collector configured to contact a shared electrolyte fluid, wherein the cells in the series are positioned such that an electrolyte fluid flowing from the inlet to the outlet of the battery containment vessel will flow from one end of the series to the other end of the series.

4. The battery system of claim 3, wherein the cathode current collector of at least one cell in the series is in physical contact with the anode of an adjacent cell.

5. The battery system of claim 1, wherein the means for dissipating heat from the battery system is disposed in the electrolyte containment vessel.

6. The battery system of claim 5, wherein the means for dissipating heat comprises a conduit in which a coolant can flow in thermal communication with an electrolyte fluid in the electrolyte containment vessel.

7. The battery system of claim 6, wherein the means for dissipating heat is a cooling coil positioned such that it can contact an electrolyte fluid in the electrolyte containment vessel.

8. The battery system of claim 1, wherein the means for dissipating heat from the battery system is in contact with the battery containment vessel.

9. The battery system of claim 8, wherein the means for dissipating heat is a tube-in-tube heat exchanger or shell-and-tube heat exchanger that incorporates the battery containment vessel in its design.

10. The battery system of claim 1, which further comprises a coolant system (d) configured to circulate coolant to the means for dissipating heat (c), wherein the coolant system is configured to accept expended coolant from the means for dissipating heat and return a lower temperature replenished coolant to the means for dissipating heat.

11. The battery system of claim 10, wherein the coolant system is a radiator, pump, compressor system or other heat exchanger.

12. The battery system of claim 11, wherein the coolant system is a fin-and-tube heat exchange radiator configured to flow expended coolant through the tube and dissipate heat through fins to produce a lower temperature replenished coolant.

13. The battery system of claim 1, wherein the means for dissipating heat from the battery system is positioned between the electrolyte containment vessel and battery containment vessel and is configured to dissipate heat from an electrolyte fluid circulating between the vessels.

14. The battery system of claim 13, wherein the means for dissipating heat is a radiator, tube-in-tube heat exchanger or shell-and-tube heat exchanger configured to accept an electrolyte fluid circulating between the electrolyte containment vessel and the battery containment vessel and to return a lower temperature electrolyte fluid to circulation.

15. The battery system of claim 14, wherein the means for dissipating heat is a fin-and-tube heat exchanger configured to flow electrolyte fluid through the tube and dissipate heat through fins to produce a lower temperature electrolyte fluid.

16. A method, comprising:
providing a battery system of claim 1;
circulating at least a portion of an electrolyte fluid between the electrolyte containment and battery containment vessels to produce electricity and hydrogen in an exothermic reaction; and
dissipating heat from the battery system.

17. The battery system of claim 1, wherein the means for dissipating heat from the battery system is a heat exchanger positioned external to the electrolyte containment vessel.

18. The battery system of claim 17, wherein the heat exchanger is a plate heat exchanger.

19. The battery system of claim 17, wherein the heat exchanger is configured to accept a flow of electrolyte fluid from the electrolyte containment vessel, cool the electrolyte fluid through thermal communication with a coolant, and return a flow of cooled electrolyte fluid to the electrolyte containment vessel.

* * * * *